United States Patent [19]

Kenealy

[11] 4,056,984

[45] Nov. 8, 1977

[54] VALVE OPERATING MECHANISM

[76] Inventor: Brian Vaughan Kenealy, 2 Glamour Avenue, Blairgowrie, Randburg 2001, Transvaal, South Africa

[21] Appl. No.: 537,394

[22] Filed: Dec. 30, 1974

[51] Int. Cl.² .................................................. F16H 27/02
[52] U.S. Cl. ............................. 74/89.15; 74/424.8 VA
[58] Field of Search ............. 74/424.8 VA, 625, 89.15

[56] References Cited

U.S. PATENT DOCUMENTS

| 2,694,320 | 11/1954 | Kron | 74/625 |
|---|---|---|---|
| 2,717,055 | 9/1955 | Heiniger | 74/625 |
| 2,878,687 | 3/1959 | Kron et al. | 74/424.8 VA |
| 2,930,571 | 3/1960 | Vogl | 74/424.8 VA |
| 3,204,484 | 9/1965 | Gustafson | 74/625 |

Primary Examiner—Samuel Scott
Assistant Examiner—Wesley S. Ratliff, Jr.

[57] ABSTRACT

Conventional manually operated gate valves may be opened or closed, but at a rate limited by the strength and agility of the operator. The subject mechanism allows such valves to be rapidly closed or opened (but not both) under the influence of stored energy in springs, or similar accumulators of energy, after the release mechanism is tripped manually or by an automatic mechanism. The mechanism also allows the valve to be opened or closed gradually, under the control of a conventional handwheel or automatic drive means.

7 Claims, 1 Drawing Figure

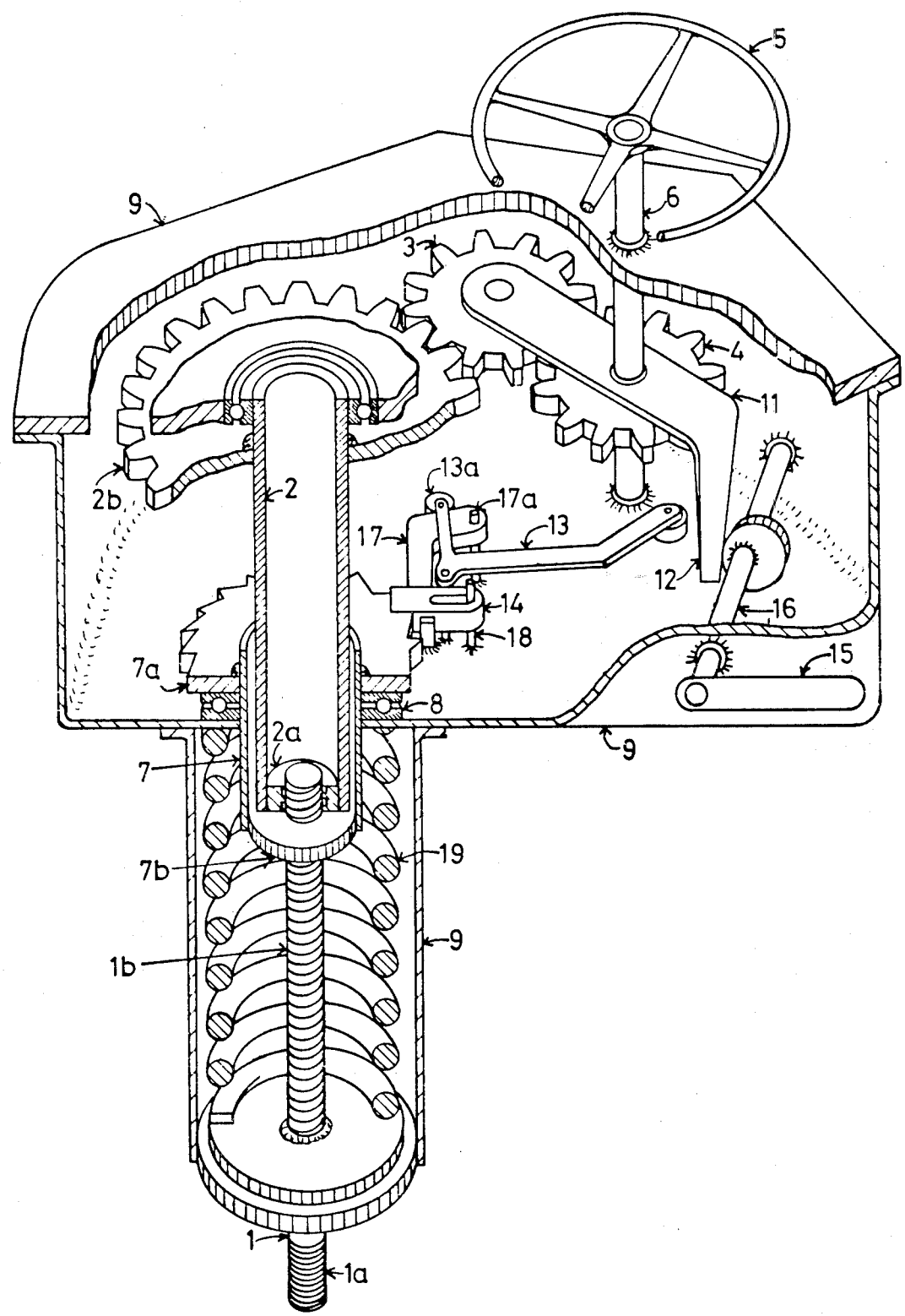

VALVE OPERATING MECHANISM

According to the invention a valve operating mechanism includes a threaded rod (which may replace the conventional spindle of a gate valve) movable longitudinally between the valve "open" position and the valve "closed" position, means biasing the rod to the closed position, a control unit rotatable on the rod to urge the rod towards the valve open position against the action of the bias, a rotatable axially fixed ratchet unit embracing the rod and adapted frictionally to abut the control unit to inhibit reverse movement thereof at least partially through the action of the bias, a pawl limiting rotation of the ratchet with the control unit during opening of the valve and means to release the pawl to allow the biasing means to urge the rod towards the closed position by causing rotation of the control unit in the reverse direction. Should the application require it the bias may, as an alternative, be in the direction of the valve "open" position and this alternative is implied in all further descriptions. Thus, when the control unit is rotated in a direction to open the valve the control unit, abutting against the ratchet unit, causes longitudinal movement of the rod. The frictional association between the control unit and the ratchet unit causes the latter to rotate with the control unit and prevents the latter from reversing. When the control unit is rotated in a direction to close the valve, friction between the ratchet unit and control unit is reduced by movement of the latter away from the ratchet unit, allowing the control unit to be rotated with relative ease.

Futher according to the invention the control unit embodies a gear wheel operatively coupled directly or indirectly to a drive pinion which is associated with mechanically operable rotating means. Preferably the rotating means is in the nature of a hand wheel, crank or some other form of prime mover, with suitable means to give automatic operation, for example an electric motor controlled by limit switches.

Also according to the invention the drive pinion is coupled to the control unit gear wheel through an idler so mounted as to be disengageable from the control means by a lateral movement relative to the rod. In one arrangement the idler pinion is rotatably mounted on a lever projecting radially away from the rod and being so mounted that in one position of the lever the idler operatively engages the control unit gear wheel and in a second position the idler frees itself from operative engagement with the control unit gear wheel. Preferably with this arrangement the lever is pivotally mounted.

Still further according to the invention electric, hydraulic, pneumatic, mechanical or hand operated means is provided for moving the lever between the two extreme positions. Preferably the means for moving the lever is operatively associated with the pawl, release means. In one arrangement for example the means is a first cam, with a second cam provided on the lever adapted to operate the pawl release means, the arrangement preferably being one wherein the idler is freed from engagement with the control unit gear wheel before the pawl is released from the ratchet.

Yet further according to the invention the rotating means is coupled to the drive pinion by way of a drive shaft, the latter being coupled to the pinion either directly, or indirectly through a bevel gear type gearbox. A bevel gear type gearbox will, for example, be utilised where the drive shaft lies transverse to the rod.

A suitable casing may further be provided for housing at least the ratchet unit, the casing being adapted to be mounted on the body of the valve, and the rod being adapted to connect to, or replace. the conventional valve spindle.

A preferred embodiment of the invention will now be described with reference to the accompanying drawing which is a partially sectioned perspective view of a valve operating mechanism.

Referring to the drawing, a valve operating mechanism includes a rod, 1, threaded at one end 1b thereof, the other end 1a being adapted to be coupled to a valve spindle, not shown. A complementary control unit 2 in the form of a gear wheel 2b connected by tubing to a threaded portion 2a is located on end 1b of the rod to act as a collar. The control unit is rotatable by means of a drive pinion 4, through an idler pinion 3. The drive pinion 4 is in turn coupled to hand wheel 5 by way of a drive shaft 6. In this case the drive shaft 6 is substantially parallel to the rod 1, such an arrangement being for a hand wheel located at the top of a valve. Alternatively where a valve requires a hand wheel on a side thereof, the drive shaft being transverse to the rod 1 is coupled to the drive pinion 4 through a bevel gear type gear box, not shown.

Located on the shaft adjacent the control unit 2 is a ratchet unit 7 comprising a ratchet wheel 7a connected to friction portion 7b by means of a tube. The ratchet unit is mounted on a thrust bearing 8 on a casing 9. The casing is adapted to be mounted on the body of a valve, not shown. Preferably the casing seals virtually the entire casing, as illustrated.

A clock-wise rotation of the hand wheel 5 causes like rotation of the drive pinion 4 which drives the gear unit in a clock-wise direction. On clock-wise rotation the control unit abuts against and frictionally engages the ratchet unit 7. Thus clock-wise rotation of the gear wheel draws the rod into the casing to open the valve.

The frictional association between the gear unit and the ratchet unit causes the latter to rotate with the gear unit on the thrust bearing, and prevents the gear unit from reversing, because of the engagement of the pawl with the ratchet.

Similarly, anti-clockwise rotation of the hand wheel 5 drives the control unit in an anti-clockwise direction by means of pinions 4 and 3. Such rotation of the control unit causes its threaded portion to move away from the ratchet units friction portion thus reducing friction between the ratchet friction portion and the control unit threaded portion and allowing the latter to be rotated with relative ease. Thus the valve may be gradually closed from an open position or any partially opened position with the hand wheel.

A release mechanism for fully closing the valve from any open or partially open position, comprises a cam 10 for operating a lever 11 to disengage the pinion 3 from the gear wheel 2b, and a second cam 12 on the lever 11 to operate a second lever 13 to release the pawl 14 of the ratchet wheel 7a. An operating lever for the cam 10 is coupled thereto by means of drive shaft 16. Lever 11 on which pinions 3 and 4 are mounted, is pivotally mounted on the casing to permit pivotal movement thereof about the axis of pinion 4. In this way the pinion 3 moves out of engagement with the control unit gear wheel 2b while the position of pinion 4 is unaffected, when cam 10 pivots the lever 11. The cam 12 operates the substantially centrally pivoting lever 13 to release lock 13a from the pawl stay 17. When unlocked, pawl 17 pivots about its mounting point 17a and allows the pawl 14 to pivot on mounting rod 18 out of engagement with the ratchet wheel 7a.

The arrangement of the release mechanism is one wherein the pinion 3 is disengaged from the control unit gear wheel before the pawl 14 of the ratchet wheel is released so that the hand wheel 5 does not rotate when the release mechanism is operated. Once the pinion 3 has been disengaged and the pawl 14 been released, the control unit 2 and ratchet unit 7 are free to rotate on the thrust bearing 8, and thus unwind from the rod 1 to close the valve. The helix angle of the thread at end 1b of the rod is sufficiently large to allow the rod to be pulled out of the casing with relative ease.

Spring means 19 ensures that the rod moves to a fully closed position when the release mechanism is operated.

In the arrangement shown in the drawing, the levers 11 and 13 return to the positions wherein pinion 3 engages control wheel 2 and pawl 14 engages the ratchet unit 7 by the action of biasing means but gravity may be used to urge the levers towards such positions.

I claim:

1. A manually energised operating mechanism for a valve including a threaded rod movable under manual control with general mechanical advantage longitudinally at low speed between a valve open position and a valve closed position as well as any intermediary position, means biasing the rod with stored mechanical energy either to the open or to the closed position, without any external power source, a control unit rotatable on the rod to urge the rod towards the desired valve position with or against the action of the bias, a rotatable axially fixed ratchet unit embracing the rod and adapted frictionally to abut the control unit to inhibit reverse movement thereof through the agency of the bias yet so proportioned as to allow a controlled slipping to occur when reverse rotation is manually applied and reduces the frictional effect between the control unit and the ratchet unit to allow the rod to move in the reverse direction, a pawl limiting rotation of the ratchet with the control unit during opening of the valve (alternatively closing of the valve), and means to release the pawl to allow the biasing means to apply the manual energy stored therein to urge the rod towards the desired position by causing rotation of the manual control in the reverse direction, the pitch of said threaded rod being such that an axial force applied thereto causes relative rotation therebetween.

2. The mechanism claimed in claim 1 wherein the control unit incorporates a gear wheel operatively coupled directly or indirectly to a drive pinion which is associated with mechanically operable rotating means.

3. The mechanism claimed in claim 2 wherein the drive pinion is coupled to the control wheel through an idler pinion so mounted as to be disengageable from the control means by a lateral movement relative to the rod.

4. The mechanism claimed in claim 3 in which the idler pinion is rotatably mounted on a lever projecting radially away from the rod and being so mounted that in one position of the lever the idler operatively engages the control unit gear wheel and in a second position the idler frees itself from operative engagement with the control unit gear wheel.

5. The mechanism claimed in claim 4 in which hand or mechanically operated means is provided for moving the lever between the two extreme positions.

6. The mechanism claimed in claim 5 wherein the means for moving the lever is operatively associated with the pawl release means.

7. The mechanism claimed in claim 6 wherein the hand or mechanically operated means comprises a first cam, with a second cam being provided on the lever to operate the pawl release means.

* * * * *